United States Patent [19]

Kroyer

[11] 4,202,851
[45] May 13, 1980

[54] METHOD OF PREPARING A SHEET-FORMED PRODUCT

[76] Inventor: Karl K. K. Krøyer, Engtoften 3, DK-8260 Viby J., Denmark

[21] Appl. No.: 804,821

[22] Filed: Jun. 8, 1977

[30] Foreign Application Priority Data

Jun. 18, 1976 [DK] Denmark .............................. 2729/76
Jul. 12, 1976 [DK] Denmark .............................. 3145/76

[51] Int. Cl.² ............................................... B29J 5/00
[52] U.S. Cl. ..................................... 264/113; 264/115; 264/122
[58] Field of Search ......................... 264/113, 115, 122

[56] References Cited

U.S. PATENT DOCUMENTS

| | | | |
|---|---|---|---|
| 2,486,050 | 10/1949 | Miller et al. | 264/113 |
| 3,084,130 | 4/1963 | Painter | 264/122 |
| 3,905,864 | 9/1975 | Curry et al. | 264/113 |
| 3,972,972 | 8/1976 | Yano | 264/122 |

Primary Examiner—Robert F. White
Assistant Examiner—James R. Hall
Attorney, Agent, or Firm—Ladas, Parry, Von Gehr, Goldsmith & Deschamps

[57] ABSTRACT

A new method of preparing a fire-resistant sheet formed product is disclosed involving the following steps: (1) grinding together a particulate inorganic material selected from the group consisting of crystallized blistered glass, crushed cement clinkers and crushed blast furnace slags, a hydraulic binder and from 10 to 2% by weight of an organic thermosetting binder in a ball mill until the particulate inorganic material has sufficiently disintegrated and the particulate inorganic material, the hydraulic binder, and the organic thermosetting binder are homogeneously distributed to form a dry mixture of particles; (2) subjecting the dry mixture of particles to heat treatment, under pressure, to consolidate and bond the dry particles into a unitary structure to form a sheet; and (3) after release of pressure, treating the sheet with water to set and cure the hydraulic binder.

17 Claims, No Drawings

METHOD OF PREPARING A SHEET-FORMED PRODUCT

This invention relates to a method of preparing a sheet-formed product, preferably a corrugated sheet or other profiled sheet.

It is known to prepare sheets, for instance corrugated sheets, containing for example about 10% of asbestos and about 90% of cement, the asbestos-cement mixture being admixed with the amount of water required for setting and curing, on which the formed mass is shaped to the desired product and caused to set, preferably in a mold.

Sheets or similar products of this type have been used for many years in the building industry, for instance for roofing, because they are cheap and relatively strong. The known sheets, however, suffer from various drawbacks. Asbestos, for instance, is a material that may cause asbestosis, and on account of this hazard it is desirable to avoid employment, working and use of asbestos-containing materials. The sheets suffer from the further disadvantages that because of the high content of hydrated and set cement they have the unfortunate property that in case of fire they will blister heavily and even burst into fragments, which may rapidly ruin the building in which they are used and involve risks to the firemen who are fighting the fire.

The known sheet-formed products are normally shaped in molds to the desired profile. Generally they can be removed from the mold only when the setting or curing has been substantially completed. Production capacity per mold will therefore be relatively low.

It is the object of the present invention to prepare sheets of the same or of greater strength than conventional asbestos-cement sheets, but without or with substantially reduced content of asbestos and without or substantially without the fire hazards. Another object of the invention is to provide a simple, effective and low cost method of preparing such sheets.

These objects have been attained by the method according to the invention, which is specific in that a dry mixture of a particulate inorganic material, a hydraulic binder, and a minor amount of an organic thermosetting binder is ground in a ball mill until the particulate inorganic material has acquired the desired degree of disintegration, while simultaneously the components have been uniformly distributed, whereupon the mixture is subjected to heat treatment under compression to the desired sheet form and the obtained self-supporting sheet product is treated with water to effect setting and curing of the hydraulic binder.

The invention is based on the experience that the content of cement or other hydraulic binder can be reduced if a relatively coarse-grained inorganic material and a minor amount of organic binder are substituted for asbestos fibers and that the product can be formed in a very short time by the application of heat and pressure to provide a self-supporting product which on the addition of water sets as a result of the reaction between the hydraulic binder and the water.

Besides overcoming the fire hazard and environmental drawbacks the invention involves considerable technical manufacturing advantages. Thus the manufacturing cycle is very short, for the product can be removed from the mold after a few minutes or after an even shorter period. The finishing treatment with water and setting may be performed outside the actual manufacturing equipment and without the necessity of employment of equipment and labor.

The ratio between the inorganic particles, hydraulic binder and organic thermosetting binder may be varied within wide limits, but the preferred composition of dry mixture according to the invention is from 50 to 88% by weight of particulate inorganic material, from 40 to 10% by weight of hydraulic binder, and from 10 to 2% by weight of organic thermosetting binder. A particularly advantageous composition, which gives satisfactory formability and good strength, comprises from 70 to 82% by weight of particulate inorganic binder, from 25-15% by weight of hydraulic binder, and from 5 to 3% by weight of organic thermosetting binder.

The preferred hydraulic binder according to the invention is cement, such as Portland cement or Rapid cement. But other hydraulic binders may be used if desired, and examples of such binder are Sorel cement (magnesia cement), aluminum cement and gypsum.

The preferred particulate inorganic material is particulate crystallized blistered glass. A material of this type can be prepared as desribed in U.S. Pat. No. 3,266,879 and is marketed under the trademark Synopal; Such Synopal particles, which have been prepared by ball mill grinding of the blistered glass present numerous hollow spaces or cavities in their surfaces which enable an effective adhesion or anchoring with a binder of inorganic or organic nature.

Instead of crystallized blistered glass particles blast-furnace slag or crushed cement clinkers of a particle size from up to 1 mm may be used according to the invention.

These cement clinkers can be made in conventional manner, for instance in a rotary kiln, and may have the partly amorphous structure characteristic of such clinkers.

It has further been found that the particulate inorganic material may advantageously be cement clinkers which have been exposed to further heat treatment to enhance the crystalline and ceramic structure. According to the present invention the particle size of the clinkers is up to and 1 mm, preferably up to and 0.5 mm.

This treatment is effected preferably by renewed heating to at least 1000° C., specifically in a rotary kiln, after the clinkers have been cooled to room temperature. The cement clinkers may for instance be heated gradually to about 1050° C. over a period of about 2 hours, whereafter the temperature is lowered gradually to about 500° C. and the product then cooled to room temperature.

Alternatively, the heating in the conventional production of cement clinkers may be continued over a longer period, for instance half an hour, and/or the heating zone in the kiln may be raised.

By these methods it is also possible to obtain wholly or partly crystallized and/or ceramic cement clinkers, though they will have a somewhat larger crystal size and thus lesser strength than that obtained by cooling and reheating.

A test of cement clinker material before and after the reheating showed a crystallized product with relatively small crystals, and the clinkers, which after the treatment and as a result of crystallization were no longer cement clinkers in the conventional meaning of the word, had acquired a substantially improved crushing resistance as demonstrated below in Example 28.

In a particularly expedient embodiment of the invention the grinding of the dry mix is performed in two steps, the organic thermosetting binder being ground in the first step together with the inorganic material until the particles have acquired the desired disintegration, and the hydraulic binder being added in the second step, on which the grinding is continued until a uniform distribution of the components has been obtained.

In this case it will be expedient to remove a fraction consisting of the finest particles, preferably the fraction the ground mixture of the first step before it is mixed with the hydraulic binder and ground in the second step. Thus it will be possible to obtain an expedient distribution of the particle size of the components, i.e. an ideal fineness characteristic, the hydraulic binder, which is fine-grained, replacing the removed finest fraction, and if the particulate material is said heat treated cement clinkers, the hydraulic binder may further compensate for any decrease in hydraulic strength caused by the crystallization. Such a material will be very dense and strong even if the content of the inorganic hydraulic binder and organic thermosetting binder is relatively low.

The added material acts as a lubricant in the molding process before setting and curing and thus causes a particularly dense depositing.

The dry ball-mill ground mix can be shaped in a mold by the application of heat and pressure for a brief period such as a few minutes. The product may then be removed immediately from the mold, for it is self-supporting and shape-retaining as a result of the content of a minor amount of organic thermosetting binder which bonds the inorganic particles together until the hydraulic binder after the treatment with water has set and cured. After the final curing the product will have attained its full strength.

The water treatment may be performed by introduction of water into the mixture during grinding and/or by immersion of the product in water. Alternatively the product may be introduced into water vapor according to the invention.

Examples of suitable thermosetting binders comprise phenolic resins, epoxy resins, urea resins and melamine resins. An organic thermoplastic binder may be added according to the invention, preferably from $\frac{1}{3}$ to 3 parts of bitumen to one part of organic thermosetting binder. The presence of bitumen increases the water resistance of the product and gives a low-cost product.

To obtain still further improvement of the mechanical properties, such as high tensile strength, high impact strength and/or improved flexibility, it will be expedient according to the invention to add also inorganic fibers to the mix, preferably glass or crystallized glass fibers. Particularly good results will be obtained if the fibers are concentrated in separate layers of the sheet product, specifically in the surface layers.

The fibers may be added to the product by spraying or sprinkling, and a conventional paper making machine using the dry method may be employed.

The fibers may also be applied to the surfaces of the product as a separate layer containing inorganic fibers, particulate inorganic material and a minor amount of organic thermosetting binder, on which the laminated material is compressed into sheets while heating to cure the organic binder.

A specifically advantageous fiber coat consists of a blistered crystallized glass paper.

The blistered crystallized glass paper may also, according to the invention, be prepared as follows: blistered crystallized glass grains are ground in a ball mill to an average grain size of about 70$\mu$. 10% by weight of phenolic resin is added and the grinding continued for about 100 minutes. Then 33% by weight of blistered crystallized glass wool is added and the grinding in the ball mill continued for a further 5 minutes, whereby the blistered crystallized glass fibers will be shortened to an average length of 3 mm. The thus obtained mixture is formed in a dry-paper machine to a fluff, which is rolled into a cohesive "paper" at 90° C., that is below the curing temperature of the organic binder. This blistered crystallized glass paper may be deposited on the surface of the mixtures containing hydraulic binder and the whole is compressed into sheets according to the invention while heating as explained above. The fluff may also in one operation be deposited directly on the surface of the mixtures containing hydraulic binder and the layers heat-pressed into sheets according to the invention.

Another possibility in the above procedure for preparing blistered crystallized glass paper is to apply the fluff in greater thickness and roll it at a temperature above the curing temperature of the organic binder to produce sheets of high impact strength.

When using a surface layer of fibrous material as explained above it will be possible in a specific embodiment of the invention to have a supporting layer consisting of conventional concrete wherein the grain size of the filler material does not substantially exceed 1 mm.

In still another embodiment of the invention the sheets may be prepared from a mixture of a particulate inorganic thermosetting binder, that is without hydraulic binder.

The method according to the invention will be illustrated below by way of examples. All quantities are given as parts by weight unless otherwise stated.

EXAMPLE 1

A mixture of 10 parts of powdered phenolic resin, 10 parts of powdered bitumen, and 80 parts of blistered crystallized glass particles was ground in a ball mill until the particles had disintegrated to a grain size of no more than to 800$\mu$. A fraction of a grain size of no more than 50$\mu$ was removed, and the remainder admixed with 30 parts of cement to 100 parts of ground mix. The powdered product was compressed to a corrugated sheet in a mold which was heated for 2 minutes to 170° C. while applying a pressure of 50 kg/cm$^2$. The pressed sheet was removed from the mold and immersed in water for 3 hours, on which it was left to cure.

EXAMPLE 2

The procedure of Example 1 was repeated with the modification that the applied pressure was 150 kg/cm$^2$. The result was a sheet of higher ultimate bending strength but lower impact strength.

EXAMPLE 3

The procedure of Example 1 was repeated with a pressure of 150 kg/cm$^2$ for half a minute, whereafter the sheet was maintained at a temperature of 170° C. for 5 minutes.

EXAMPLE 4

The procedure of Example 1 was repeated using 3 parts of powdered phenolic resin and 3 parts of powdered bitumen to 94 parts of blistered crystallized glass particles.

EXAMPLE 5

The procedure of Example 1 was repeated using 10 parts of powdered phenolic resin and 3 parts of powdered bitumen to 87 parts of blistered crystallized glass particles and adding the powdered bitumen after the grinding in the ball mill.

EXAMPLE 6

The procedure of Example 1 was repeated adding simultaneously with the powdered phenolic resin one part of ethyl alcohol, which was allowed to evaporate before the addition of the powdered bitumen.

EXAMPLE 7

The procedure of Example 2 was repeated adding simultaneously with the powdered phenolic resin one part of ethyl alcohol, which was allowed to evaporate before the addition of the powdered bitumen.

EXAMPLE 8

The procedure of Example 3 was repeated adding simultaneously with the powdered phenolic resin one part of ethyl alcohol.

EXAMPLE 9

Cement clinkers with an addition of 1% of gypsum were ground in a ball mill with 3% of phenolic resin until the grain size was max 800$\mu$. This resulted in about 25% of material of a fineness like that of cement, viz. below about 100$\mu$. Then the mixture was compressed for one minute at 170° C. while applying a pressure of 100 kg/cm$^2$ to form a slab of 60×60×0.7 cm. The slab was held immersed in water until it had absorbed about 10% of water and left to stand at room temperature to cure.

EXAMPLE 10

The procedure of Example 9 was repeated adding 10% of water before compression and without immersing the pressed slab in water.

EXAMPLE 11

The procedure of Example 9 was repeated adding 10% of water before compression and holding the pressed slab immersed in water for about 30 minutes.

EXAMPLE 12

The procedure of Example 9 was repeated adding, instead of 3% of phenolic resin, 5% of bitumen.

EXAMPLE 13

A mixture of 65 parts by weight of blistered crystallized glass particles of no more than 2 mm, 32 parts by weight of Portland cement, and 3 parts of phenolic resin was ground in a ball mill for 2 hours, whereby the product acquired a grain size of no more than 800$\mu$. The mixture was compressed to a sheet in a mold at a pressure of 50 kg/cm$^2$ and a temperature of 160° C. for one minute. Then the pressed sheet was introduced into vapor for 3 hours.

EXAMPLE 14

The procedure of Example 13 was repeated with the modification that the ground dry mixture was formed to a sheet which in a conventional dry-paper machine was provided on both sides with blistered crystallized glass fibers, to which was added 10% of melamine resin during the fiber shortening, the so-called defibration, whereupon the product was compressed and finished as described.

EXAMPLE 15

The procedure of Example 14 was repeated with rockwool fibers instead of blistered crystallized glass fibers.

EXAMPLE 16

The procedure of Example 14 was repeated with glass wool fibers instead of blistered crystallized glass fibers.

EXAMPLE 17

The procedures of Examples 14, 15 and 16 were repeated adding to the fibers instead of melamine resin 10% of powdered phenolic resin, a substantial part of which was below 100$\mu$.

EXAMPLE 18

The procedures of Examples 14, 15 and 16 were repeated adding to the fibers 50% of blistered crystallized glass particles of no more than to 100$\mu$.

EXAMPLE 19

The procedures of Example 17 were repeated adding to the fibers 50% of crystallized blistered glass particles of no more than 100$\mu$.

EXAMPLE 20

The procedures of Examples 14, 15 and 16 were repeated adding to the fibers instead of melamine resin 5% of phenolic resin and 5% of bitumen and further adding 50% of crystallized blistered glass particles of no more than 100$\mu$.

EXAMPLE 21

The procedures of Examples 14, 15 and 16 were repeated adding to the fibers instead of melamine resin 10% of acrylic resin and further adding 50% of crystallized blistered glass particles of no more than 100$\mu$.

EXAMPLE 22

A mixture of 88 parts of crystallized blistered glass particles, 10 parts of cement, and 2 parts of phenolformaldehyde resin was prepared as described in Example 13 and formed to a sheet, which was provided on both sides with crystallized blister glass paper by the previously described method according to the invention. The laminated sheet was compressed at a pressure of 100 kg/cm$^2$ and a temperature of 160° C. for one minute, and the pressed sheet was introduced in vapour for 3 hours. Owing to the low content of organic binder the result was a cheap and non-flammable sheet.

EXAMPLE 23

On a sheet of crystallized blistered glass paper prepared by the previously described method according to the invention was deposited 10 times the weight thereof of crystallized blistered glass powder with 2.5% of phenolic resin and on top of that again a sheet of Synopal paper, whereupon the whole was caused to thermoset at 170° C. at a pressure of 100 kg/cm$^2$ for 3 minutes.

EXAMPLE 24

The procedure of Example 23 was repeated with the modification that instead of the crystallized blistered glass powder with 2.5% of phenolic resin was used a mixture of 67.5 parts of crystallized blistered glass powder, 20 parts of cement, 2.5 parts of phenolic resin and 10 parts of water. The result was a sheet which in proportion to the total content of fibers and organic binder had a very high strength and was fire resistant or even fireproof.

EXAMPLE 25

The procedure of Example 24 was repeated and the crystallized blistered glass paper on both sides was provided with a surface over which no straight lines could be drawn. This was done by providing the surface with rounded elevations with rounded recesses in between, said elevations and recesses having a diameter of 6 mm and a depth of 0.8 mm.

The result was a crystallized blistered glass fiber coat of high strength and stretchable to improve the tensile bending strength.

EXAMPLE 26

The procedure of Example 25 was repeated the elevations and recesses having a diameter of 3 mm and a depth of 0.2 mm.

EXAMPLE 27

The procedure of Example 25 was repeated, only the crystallized blistered glass paper on the side of the sheet which is to face inwardly or downwardly being provided with the said surface. Normally, a pressure or impact may be expected to hit the sheet from above or from outside and it will therefore generally be sufficient that the downwardly or inwardly facing side is "corrugated" and stretchable.

EXAMPLE 28

Further, a comparison has been made between two types of particulate materials applicable according to the invention, viz. crushed cement clinkers and cement clinkers that have been subjected to further heat treatment, with a view to examining the difference in crushing resistance. The crushing resistance was determined by the following standard test:

A fraction of a grain size of from 5 to 7 mm was clean-separated for 5 minutes on a 5 mm screen, and 500 g were weighed and filled into a testing cylinder. On the sample was placed a 4 kg plunger and the sample was subjected to 25 impacts with a 14 kg drop hammer from a height of 25 cm. The sample was then sifted on 5-4-3-2-1 mm screens for 5 minutes and the crushing number was calculated as shown by the following tables:

TABLE 1

| fraction | size of holes in screens (mm) | amount of sample with given particle size | % of total sample with given particle size | crushing number |
|---|---|---|---|---|
| (f) | +5 | 408 g | 81.6% | |
| (e) | +4 | 31 g | 6.2 = e | 18.4(a+b+c+d+e) |
| (d) | +3 | 17 g | 3.4 = d | 12.2(a+b+c+d) |
| (c) | +2 | 11 g | 2.2 = c | 8.8(a+b+c) |
| (b) | +1 | 11 g | 2.2 = b | 6.6(a+b) |
| (a) | ÷1 | 22 g | 4.4 = a | 4.4(a) |
| | | 500 g | 100.0% | 50.4 |

Crushing number: 50. It will be noted that the crushing resistance increases as values decrease.

TABLE 2a

Examination of cement clinkers: Without heating (amorphous)

| Size of holes in screens (mm) | Amount of sample with given particle size | % of sample with the given particle size | Crushing number |
|---|---|---|---|
| 5 | 275 | 55.0% | |
| 4 | 64 | 12.8% | 45.0 |
| 3 | 66 | 13.2% | 32.2 |
| 2 | 29 | 5.8% | 19.0 |
| 1 | 25 | 5.0% | 13.2 |
| ÷1 | 41 | 8.2% | 8.2 |
| | 500 | 100% | 117.6 |

Crushing number: 118

TABLE 2b

After heating from room temperature to 1050° C. (crystallized)

| Size of holes in screens (mm) | Amount of sample with given particle size | % of sample with the given particle size | Crushing number |
|---|---|---|---|
| 5 | 372 | 74.4% | |
| 4 | 39 | 7.8% | 25.6 |
| 3 | 37 | 7.4% | 17.8 |
| 2 | 15 | 3.0% | 10.4 |
| 1 | 13 | 2.6% | 7.4 |
| ÷1 | 24 | 4.8% | 4.8 |
| | 500 g | 100% | 66.0 |

Crushing number: 66

The heat treatment thus reduced the crushing number by almost one half.

What I claim is:

1. A method of preparing a fire-resistant sheet-formed product which comprises the steps of:
    (a) grinding together and forming a uniform dry mixture
        (i) a particulate inorganic material selected from the group consisting of crystallized blistered glass, crushed cement clinkers and crushed blast-furnace slags;
        (ii) a hydraulic binder; and
        (iii) from 10 to 20% by weight of an organic thermosetting binder;
   the grinding and mixing together being effected in a ball mill until the particulate inorganic material has sufficiently disintegrated and the particulate inorganic material, the hydraulic binder, and the organic thermosetting binder are homogeneously distributed to form a dry mixture of particles;
    (b) placing the dry mixture of particles formed during step (a) into a mold, closing the mold, hot pressing said material in said mold to bring about a setting of the organic binder, thereby consolidating and bonding the dry particles into a unitary structure to form a self-supporting sheet; and
    (c) after release of pressure, opening the mold, removing said self-supporting sheet, and treating said sheet with water to set and cure the hydraulic binder to form said fire-resistant sheet-formed product.

2. A method according to claim 1, wherein the dry mixture contains from 50 to 88% by weight of particulate inorganic material and from 40 to 10% by weight of hydraulic binder.

3. A method according to claim 1, wherein the hydraulic binder is cement.

4. A method according to claim 1, wherein the particulate inorganic material consists of particles of crystallized blistered glass.

5. A method according to claim 1, wherein the particulate inorganic material is crushed cement clinkers of a particle size up to 1 mm.

6. A method according to claim 1, wherein the particulate inorganic material is crushed cement clinkers having been subjected to prior heat to strengthen its crystalline and ceramic structure.

7. A method according to claim 1, comprising use of cement clinkers which have been previously heated to at least 1,000° C. after a prior cooling to room temperature.

8. A method according to claim 1, wherein the particulate inorganic material is crushed blast-furnace slag of a particle size up to 1 mm.

9. A method according to claim 1, wherein step (a) is performed in two steps, the organic thermosetting binder first being ground together with the inorganic material until the particles have acquired the desired disintegration and the hydraulic binder being added in the second step, whereupon the grinding is continued until a uniform distribution of the components has been effected.

10. A method according to claim 9, comprising extracting from the mixture of organic thermosetting binder and particulate inorganic material ground in the first step a fraction consisting of the particles up to 50 microns before the mixture is admixed with the hydraulic binder and ground in the second step.

11. A method according to claim 1, wherein the water treatment in step (c) is effected by introducing the self-supporting sheet into water vapor.

12. A method according to claim 1, wherein the organic thermosetting binder is selected from the group consisting of a phenolic resin, an epoxy resin, a urea resin, and a melamine resin.

13. A method according to claim 1, wherein further comprising adding an organic thermoplastic binder to the mixture between steps (a) and (b).

14. A method according to claim 13, wherein the organic thermoplastic binder is bitumen which is added in an amount of from ⅓ to 3 parts to one part of organic thermosetting binder.

15. A method according to claim 1, wherein the maximum particle size of the inorganic material after grinding is from 600 to 800μ.

16. A method according to claim 1, further comprising adding inorganic fibers between steps (a) and (b).

17. A method according to claim 16, wherein the fibers are concentrated in separate layers of the sheet product.

* * * * *

UNITED STATES PATENT AND TRADEMARK OFFICE
CERTIFICATE OF CORRECTION

PATENT NO. : 4,202,851
DATED : May 13, 1980
INVENTOR(S) : Karl K. K. Kroyer

It is certified that error appears in the above-identified patent and that said Letters Patent are hereby corrected as shown below:

In Claim 1, line 10,"from 10 to 20% by weight" should read --from 10 to 2% by weight--.

Signed and Sealed this

Ninth Day of September 1980

[SEAL]

Attest:

SIDNEY A. DIAMOND

Attesting Officer       Commissioner of Patents and Trademarks